(12) United States Patent
Nagura et al.

(10) Patent No.: US 7,662,445 B2
(45) Date of Patent: Feb. 16, 2010

(54) CYCLIC OLEFIN-BASED COPOLYMER, FILM, AND POLARIZING PLATE AND LIQUID CRYSTAL DISPLAY DEVICE INCLUDING THE SAME

(75) Inventors: Masato Nagura, Minami-Ashigara (JP); Seiya Sakurai, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 12/235,867

(22) Filed: Sep. 23, 2008

(65) Prior Publication Data

US 2009/0082536 A1   Mar. 26, 2009

(30) Foreign Application Priority Data

Sep. 25, 2007   (JP) ............................. 2007-248087
Mar. 7, 2008   (JP) ............................. 2008-058591

(51) Int. Cl.
*G02B 1/08* (2006.01)
*C08F 236/20* (2006.01)
*C08F 232/08* (2006.01)
*C08F 4/642* (2006.01)

(52) U.S. Cl. ..................... 428/1.31; 428/1.1; 526/281; 526/282

(58) Field of Classification Search ................. 526/281, 526/282; 428/1.1, 1.31
See application file for complete search history.

(56) References Cited

U.S. PATENT DOCUMENTS 5,008,356 A * 4/1991 Ishimaru et al. ............. 526/281

FOREIGN PATENT DOCUMENTS

| JP | 6-093040 A | 4/1994 |
|----|------------|--------|
| JP | 2619856 B2 | 6/1997 |
| JP | 2002-114827 A | 4/2002 |
| JP | 2007-009010 A | 1/2007 |
| JP | 2007-119660 A | 5/2007 |

OTHER PUBLICATIONS

Hye Young Jung et al., "Norbornene copolymerization with α-olefins using methylene-bridged *ansa*-zirconocene," Polyhedron, 2005, pp. 1269-1273, vol. 24, Elsevier Ltd. (cited on p. 2 of present specification).

* cited by examiner

*Primary Examiner*—Fred M Teskin
(74) *Attorney, Agent, or Firm*—Buchanan Ingersoll & Rooney PC

(57) ABSTRACT

A copolymer contains 10 to 69 mol % of a structural unit derived from propylene, 1 to 50 mol % of a structural unit derived from at least one α-olefin having a carbon number of from 4 to 20 and 30 to 89 mol % of a structural unit derived from at least one cyclic olefin represented by the formula (1) as defined herein, and has a weight average molecular weight of from 50,000 to 1,000,000.

10 Claims, No Drawings

CYCLIC OLEFIN-BASED COPOLYMER, FILM, AND POLARIZING PLATE AND LIQUID CRYSTAL DISPLAY DEVICE INCLUDING THE SAME

FIELD OF THE INVENTION

The present invention relates to a cyclic olefin-based copolymer, a film, a polarizing plate and a liquid crystal display device.

BACKGROUND OF THE INVENTION

In recent years, a cyclic olefin-based copolymer obtained by copolymerizing ethylene and a specific cyclic olefin is attracting attention as a plastic-based optical material requiring transparency. The cyclic olefin-based copolymer is excellent not only in the transparency but also in the resistance against moisture, chemicals, heat and the like and its application is expected to expand, for example, into an optical material such as optical fiber and plastic resin (see, for example, JP-A-6-93040 (the term "JP-A" as used herein means an "unexamined published Japanese patent application") and Japanese Patent 2,619,856). Studies are also being made on use as an optical film and with regard to a film capable of improving the hygroscopic property and moisture permeability of the conventionally employed cellulose acetate film, development of a polarizing plate protective film produced by heat melt film formation or solution film formation is proceeding (see, for example, JP-A-2002-114827 and JP-A-2007-9010).

However, the copolymer composed of ethylene and a cyclic olefin is hard and brittle and has a problem that the mechanical strength is low and the handleability and processability are bad.

Also, a copolymer of an α-olefin having a carbon number of 4 to 12 and a cyclic olefin is reported (see, for example, Polyhedron, Vol. 24, pp. 1269-1273 (2005) and JP-A-2007-119660). However, the copolymer described in Polyhedron, Vol. 24, pp. 1269-1273 (2005) has a small molecular weight and is not suitable as a molding material. The copolymer obtained by the production method described in JP-A-2007-119660 has an appropriate molecular weight and can be improved in the brittleness as compared with the copolymer composed of ethylene and a cyclic olefin while maintaining the properties such as transparency and moisture resistance.

SUMMARY OF THE INVENTION

However, the above-described conventional film using a cyclic olefin is disadvantageous in that the modulus of elasticity is low.

An object of the present invention is to provide a cyclic olefin-based copolymer for providing a film that is low in the hygroscopic property and moisture permeability and assured of appropriate elasticity, no brittleness and excellent mechanical strength; a film; and a polarizing plate and a liquid crystal display device each using the same.

As a result of intensive studies, the present inventors have found that the above-described object can be attained by the following means.

1. A copolymer comprising at least (A) a structural unit derived from propylene, (B) a structural unit derived from at least one α-olefin having a carbon number of 4 to 20, and (C) a structural unit derived from at least one cyclic olefin represented by the following formula (1), wherein the copolymer contains from 10 to 69 mol % of the structural unit (A), from 1 to 50 mol % of the structural unit (B) and from 30 to 89 mol % of the structural unit (C) and the weight average molecular weight is from 50,000 to 1,000,000:

Formula (1):

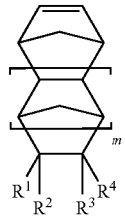

wherein $R^1$ to $R^4$ each independently represents a hydrogen atom or an alkyl group, at least two members out of $R^1$ to $R^4$ may combine with each other to form a monocyclic or polycyclic ring, and the monocyclic or polycyclic ring may have a double bond; m represents 0 or 1; and the pair of $R^1$ and $R^2$ or of $R^3$ and $R^4$ may form an alkylidene group.

2. The copolymer as described in 1 above, wherein in formula (1), m is 0.

3. The copolymer as described in 1 or 2 above, wherein the structural unit (B) is a structural unit derived from at least one α-olefin having a carbon number of 4 to 15.

4. The copolymer as described in 1 above, wherein the structural unit (B) is a structural unit derived from at least one α-olefin having a carbon number of 6 to 12 and the structural unit (C) is a structural unit derived from norbornene.

5. A film comprising the copolymer described in any one of 1 to 4 above.

6. A polarizing plate using the film described in 5 above.

7. A liquid crystal display device using the polarizing plate described in 6 above.

According to the present invention, a cyclic olefin-based copolymer for providing a film that is low in the hygroscopic property and moisture permeability and assured of appropriate elasticity, no brittleness and excellent mechanical strength; a film; and a polarizing plate and a liquid crystal display device each using the same, can be provided.

DETAILED DESCRIPTION OF THE INVENTION

The present invention is described in detail below. In the following, the constituent requirements are sometimes described based on representative embodiments of the present invention, but the present invention is not limited to these embodiments. Incidentally, in the context of the present invention, the numerical value range expressed using "from (numerical value) to (numerical value)" means a range including the numerical values before and after "to" as the lower limit and the upper limit, respectively.

The copolymer (sometimes referred to as a "cyclic olefin-based copolymer) of the present invention is a copolymer comprising at least (A) a structural unit derived from propylene, (B) a structural unit derived from at least one α-olefin having a carbon number of 4 to 20, and (C) a structural unit derived from at least one cyclic olefin represented by the following formula (I), wherein the copolymer contains the structural unit (A) in a proportion of 10 to 69 mol % based on the entire copolymer, the structural unit (B) in a proportion of 1 to 50 mol % based on the entire copolymer, and the structural unit (C) in a proportion of 30 to 89 mol % based on the entire copolymer. Also, the weight average molecular weight of the copolymer of the present invention is from 50,000 to 1,000,000.

Formula (1):

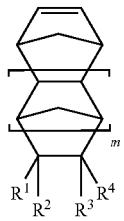

In formula (1), $R^1$ to $R^4$ each independently represents a hydrogen atom or an alkyl group, at least two members out of $R^1$ to $R^4$ may combine with each other to form a monocyclic or polycyclic ring, and the monocyclic or polycyclic ring may have a double bond. m represents 0 or 1. The pair of $R^1$ and $R^2$ or of $R^3$ and $R^4$ may form an alkylidene group.

(α-Olefin)

The α-olefin having a carbon number of 4 to 20 of (B), which can be used in the present invention, may be linear or branched or may form a cyclic structure. Specific examples thereof include 1-butene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, and 3-cyclohexylpropene. In view of easy availability and physical properties of the film obtained from the copolymer of the present invention, an α-olefin having a carbon number of 4 to 15 is preferred, and an α-olefin having a carbon number of 6 to 12 is more preferred.

One kind of the α-olefin of (B) may be used, or a plurality of kinds thereof may be used in combination.

(Cyclic Olefin)

The cyclic olefin of (C) for use in the present invention is represented by the following formula (1):

Formula (1):

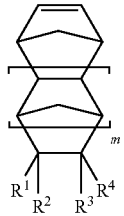

In formula (1), $R^1$ to $R^4$ each independently represents a hydrogen atom or an alkyl group, at least two members out of $R^1$ to $R^4$ may combine with each other to form a monocyclic or polycyclic ring, and the monocyclic or polycyclic ring may have a double bond. m represents 0 or 1. The pair of $R^1$ and $R^2$ or of $R^3$ and $R^4$ may form an alkylidene group.

In the case where $R^1$ to $R^4$ represent an alkyl group, the alkyl group is preferably an alkyl group having a carbon number of 1 to 20 and may be linear or branched or may have a cyclic structure. Specific examples thereof include a methyl group, an ethyl group, a propyl group, an isopropyl group, a pentyl group, a hexyl group, an octyl group, a decyl group, a dodecyl group, an octadecyl group, and a cyclohexyl group.

At least two members out of $R^1$ to $R^4$ may combine with each other to form a cyclic structure, and the monocyclic or polycyclic ring may have a double bond.

The pair of $R^1$ and $R^2$ or of $R^3$ and $R^4$ may form an alkylidene group. This alkylidene group is usually an alkylidene group having a carbon number of 2 to 20, and specific example of the alkylidene group include ethylidene, propylidene, and isopropylidene.

Specific examples of the cyclic olefin compound represented by formula (1) are set forth below.

(1)

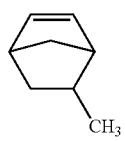

(2)

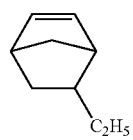

(3)

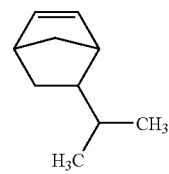

(4)

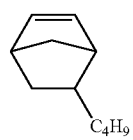

(5)

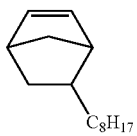

(6)

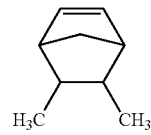

(7)

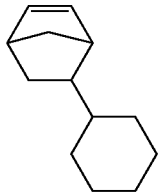

(8)

-continued (9) 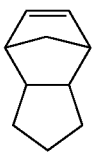

(10) 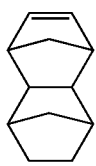

(11) 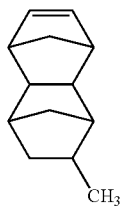

(12) 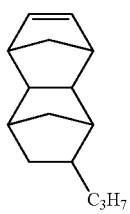

(13) 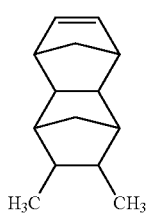

(14) 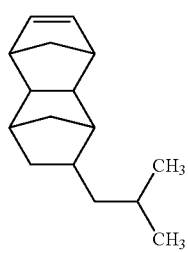

(15) 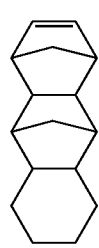

(16) 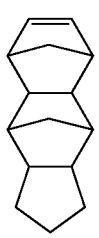

(17) 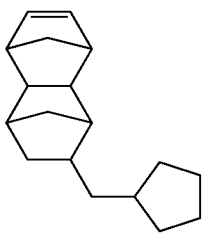

(18) 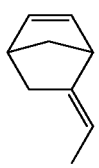

In formula (1), m represents 0 or 1, but m=0 is preferred.

Out of cyclic olefins represented by formula (1), norbornene (in formula (1), m=0 and $R^1$ to $R^4$ all are a hydrogen atom) is more preferred.

One of the cyclic olefin for use in the present invention may be used alone, or a plurality of the cyclic olefins may be used in combination.

The cyclic olefin represented by formula (1) can be synthesized, for example, by a known method of causing a Diels-Alder reaction between cyclopentadiene and an olefin having a corresponding structure.

The copolymer of the present invention can be synthesized by a known technique. Details thereof are described, for example, in JP-A-5-301926 and JP-A-2004-107442. As regards the catalyst used in the polymerization, catalysts described also in the publications above may be suitably used. In particular, catalysts described in JP-A-2004-107442 are preferred.

The copolymer of the present invention contains the (A) structural unit derived from propylene in a proportion of 10 to 69 mol %, the (B) structural unit derived from an α-olefin having a carbon number of 4 to 20 in a proportion of 1 to 50 mol %, and the (C) structural unit derived from a cyclic olefin represented by the following formula (1) in a proportion of 30 to 89 mol %. By using a copolymer satisfying these ranges, a film low in the hygroscopic property and moisture permeability and assured of appropriate elasticity, no brittleness and excellent mechanical strength can be obtained.

A copolymer containing the (A) structural unit derived from propylene in a proportion of 15 to 55 mol %, the (B) structural unit derived from an α-olefin having a carbon number of 4 to 20 in a proportion of 1 to 40 mol %, and the (C) structural unit derived from a cyclic olefin represented by the following formula (1) in a proportion of 35 to 80 mol % is preferred, and a copolymer containing the (A) structural unit derived from propylene in a proportion of 20 to 40 mol %, the (B) structural unit derived from an α-olefin having a carbon number of 4 to 20 in a proportion of 1 to 35 mol %, and the (C)

structural unit derived from a cyclic olefin represented by the following formula (1) in a proportion of 35 to 70 mol % is more preferred.

The proportion (mol %) of each structural unit contained in the copolymer can be determined by the measurement such as $^1$H-NMR and $^{13}$C-NMR.

The weight average molecular weight as determined by gel permeation chromatography (GPC) of the copolymer of the present invention is from 50,000 to 1,000,000. If the weight average molecular weight is less than 50,000, the film using the copolymer decreases in the self-supporting property and lacks the breaking strength, whereas if the weight average molecular weight exceeds 1,000,000, the forming processability deteriorates and handling becomes difficult. The weight average molecular weight is preferably from 60,000 to 500,000, more preferably from 70,000 to 300,000, still more preferably from 70,000 to 200,000.

The molecular weight distribution (Mw/Mn) as determined by GPC of the copolymer of the present invention is preferably in a range of $1.0<(Mw/Mn)\leqq3.0$, more preferably in a range of $1.0<(Mw/Mn)\leqq2.5$.

Incidentally, the molecular weight distribution indicates a ratio (Mw/Mn) between weight average molecular weight (Mw) and number average molecular weight (Mn) measured by GPC.

The weight average molecular weight and molecular weight distribution of the copolymer of the present invention were determined by performing the GPC measurement under the following conditions.

Apparatus: HLC-8121GPC/HT (Tosoh Corporation)
Column: $TSK_{gel}$ $GMH_{HR}$-H(20)HT (7.8 mm×300 mm)×2
Detector: HLC-8221GPC/HT-incorporated RI detector
Measurement solvent: o-dichlorobenzene
Measurement flow rate: 1 mL/min
Measurement temperature: 145° C.
Amount of sample poured: 500 µL
Standard sample: monodisperse polystyrene×16 (Tosoh Corporation)

In view of strength and forming processability, the glass transition temperature of the copolymer of the present invention is preferably from 50 to 250° C., more preferably from 60 to 220° C., still more preferably from 80 to 200° C.

The copolymer of the present invention preferably has a linear expansion coefficient of $110\times10^{-6}/°$ C. or less. If the linear expansion coefficient exceeds $110\times10^{-6}/°$ C., material deformation occurs due to temperature change and the dimensional stability cannot be ensured. The linear expansion coefficient is preferably $90\times10^{-6}/°$ C. or less, more preferably $80\times10^{-6}/°$ C. or less, still more preferably $75\times10^{-6}/°$ C. or less.

The copolymer of the present invention may contain other species of structural unit within the range not impairing the object of the present invention, in addition to those (A) structural unit derived from propylene, (B) structural unit derived from at least one α-olefin having a carbon number of 4 to 20 and (C) structural unit derived from at least one cyclic olefin represented by the following formula (1).

The film produced using the copolymer of the present invention is preferably used in particular as a protective film of a polarizing plate or liquid crystal display element.

The film can be produced (formed) by a known method such as solution casting method, melt extrusion method, heat press method and calendar method. Above all, a melt extrusion method is preferred in view of productivity and profitability and also from environmental aspect because of no use of a solvent. In the melt extrusion method, a method of extruding a copolymer (resin) by using a T-die and transferring it to a cooling roll is preferably used. The resin temperature at the extrusion is determined by taking into consideration the flowability, thermal stability and the like of the resin, but the copolymer of the present invention is preferably extruded at 110 to 300° C. If the resin temperature is less than 110° C., the melt viscosity becomes too high, whereas if it exceeds 300° C., the transparency and homogeneity of the film may be impaired due to decompositional deterioration or gelling of the resin. The resin temperature is more preferably from 120 to 290° C., still more preferably from 140 to 280° C. In order to suppress oxidative deterioration of the resin at the melt extrusion, it is also preferred to add an antioxidant.

The film of the present invention has excellent mechanical strength with little dimensional change due to humidity change and therefore, can be suitably used as a protective film of a polarizing plate, a liquid crystal display element or the like.

Also, the film of the present invention can be imparted with optical anisotropy by stretching/orientation or the like. For example, in use as a retardation film, the unstretched film obtained by the method above may be stretched and oriented to obtain a desired film. The stretching method is not particularly limited, and there may be used a known method such as longitudinal uniaxial stretching of stretching the film between rolls, transverse uniaxial stretching using a tenter, or simultaneous or sequential biaxial stretching combining those longitudinal stretching and transverse stretching. Furthermore, the stretching is preferably performed in a continuous system in view of productivity but may be performed in a batch system, and this is not particularly limited. The stretching temperature is, with respect to the glass transition temperature (Tg), from (Tg−20° C.) to (Tg+30° C.), preferably from (Tg−10° C.) to (Tg+20° C.). The stretch ratio is determined according to the objective retardation value but preferably, in each of longitudinal direction and transverse direction, from 1.05 to 4 times, preferably from 1.1 to 3 times.

(Additive)

In the copolymer of the present invention, various additives (for example, a deterioration inhibitor, an ultraviolet inhibitor, a retardation (optical anisotropy) adjusting agent, a fine particle, a separation accelerator and an infrared absorbent) according to usage may be added in each preparation step. The additive may be solid or liquid. As for the timing of addition, in the case of film formation by a solution casting method, the additive may be added at any stage in the process of producing a copolymer-containing solution (dope), but a step of adding the additive to prepare a dope may be added as a final preparation step of the dope preparation process.

(Deterioration Inhibitor)

In the copolymer of the present invention, a known deterioration (oxidation) inhibitor, for example, a phenol-based or hydroquinone-based antioxidant such as 2,6-di-tert-butyl, 4-methylphenol, 4,4'-thiobis-(6-tert-butyl-3-methylphenol), and pentaerythrityl-tetrakis[3-(3,5-di-tert-butyl-4-hydroxyphenyl)propionate, may be added. Furthermore, it is preferred to add a phosphorus-based antioxidant such as tris(4-methoxy-3,5-diphenyl) phosphite, tris(nonylphenyl) phosphite, and bis(2,4-di-tert-butyl-phenyl)pentaerythritol diphosphite. The amount of the antioxidant added is preferably from 0.05 to 5.0 parts by mass per 100 parts by mass of the copolymer.

(Ultraviolet Absorbent)

In the copolymer of the present invention, an ultraviolet absorbent is preferably used from the standpoint of preventing deterioration of a polarizing plate, a liquid crystal display and the like. In view of excellent ability of absorbing an ultraviolet ray at a wavelength of 370 nm or less and good displaying property on liquid crystal, an ultraviolet absorbent having little absorption of visible light at a wavelength of 400 nm or more is preferably used. Specific examples of the ultraviolet absorbent that is preferably used in the present invention include a hindered phenol-based compound, an oxybenzophenone-based compound, a benzotriazole-based compound, a salicylic acid ester-based compound, a benzophenone-based compound, a cyanoacrylate-based compound, and a nickel complex salt-based compound. The amount of the ultraviolet inhibitor added is preferably from 1 ppm to 1.0%, more preferably from 10 to 1,000 ppm, in terms of the mass ratio to the copolymer of the present invention.

(Fine Particle)

For improving poor slidability on the film surface, it is effective to impart unevenness to the film surface. There is known a method of incorporating fine particles of an organic or inorganic material to increase the roughness of the film surface and effect so-called matting, thereby decreasing blocking of films to each other. Furthermore, when fine particles are present in the film of the present invention or at least on one surface of the film of the present invention, the adherence of a film comprising the copolymer of the present invention to a polarizer at the processing of a polarizing plate is remarkably enhanced.

In the case of using an inorganic fine particle, the matting agent is preferably a fine particle having an average particle diameter of 0.05 to 0.5 μm, more preferably from 0.08 to 0.3 μm, still more preferably from 0.1 to 0.25 μm.

The fine particle is, as an inorganic compound, preferably silicon dioxide, silicone or titanium dioxide and, as a polymer compound, preferably fluororesin, nylon, polypropylene or chlorinated polyether. The fine particle is more preferably silicon dioxide, still more preferably silicon dioxide surface-treated with an organic material.

(Retardation Developer)

In order to develop a retardation value, a compound having at least two aromatic rings can be used as a retardation developer. In the case of using a retardation developer, this is preferably used in an amount of 0.05 to 20 parts by mass, more preferably from 0.1 to 10 parts by mass, still more preferably from 0.2 to 5 parts by mass, and most preferably from 0.5 to 2 parts by mass, per 100 parts by mass of the copolymer of the present invention. Two or more kinds of retardation developers may be used in combination.

The retardation developer preferably has maximum absorption in the wavelength region of 250 to 400 nm and preferably has substantially no absorption in the visible region. The "aromatic ring" as used herein includes an aromatic hetero ring, in addition to an aromatic hydro-carbon ring.

The number of aromatic rings in the retardation developer is preferably from 2 to 20, more preferably from 2 to 12, still more preferably from 2 to 8, and most preferably from 2 to 6.

Examples of the retardation developer include, but are not limited to, developers described in EP-A2-0911656 and JP-A-2003-344655.

The thickness of the film of the present invention varies depending on the end use but is preferably from 20 to 500 μm, more preferably from 30 to 150 μm, and in use for a liquid crystal display device, still more preferably from 40 to 110 μm.

(Moisture Permeability of Film)

As for the preferred moisture permeability of the film of the present invention, considering usage as a polarizing plate protective film, the moisture permeability at 40° C.×90% RH is preferably from 200 to 400 (g/m$^2$/24 h), more preferably from 250 to 390 (g/m$^2$/24 h), still more preferably from 300 to 380 (g/m$^2$/24 h). If the moisture permeability is less than the range above, moisture release from the polarizer may be prevented at the processing of a polarizing plate, resulting in keeping the inside of the polarizer at high humidity, and deterioration of the polarizer may rapidly proceed to cause reduction in the performance of the polarizing plate. Also, because of bad adherence between the hydrophilic polarizer typified by polyvinyl alcohol and the protective film, separation of the film from the polarizer may occur, which leads to worsening of durability of the polarizing plate and reduction in the yield at the punching work. On the contrary, if the moisture permeability exceeds the range above, the adherence between the hydrophilic polarizer and the protective film may be sufficiently high and the problem ascribable to separation may not arise, but the polarizer in the inside is also susceptible to change in the external environment such as humidity, making it difficult to prevent deterioration of the polarize in the inside, and the film fails in sufficiently functioning as a protective film.

In using the film of the present invention as a polarizing plate protective film, the film may be used as a protective film on both surfaces of the polarizer or may be used only on one surface. In the case of using the film only on one surface, a conventionally employed film such as cellulose triacetate film may be used for the other surface.

(Optical Properties of Film)

Preferred optical properties of the film of the present invention vary depending on the end use of the film. In the case of usage as a polarizing plate protective film, at the measurement wavelength of 590 nm, the in-plane retardation (Re) is preferably 5 nm or less, more preferably 3 nm or less, and the retardation in a thickness direction (Rth) is preferably 50 nm or less, more preferably 35 nm or less, still more preferably 10 nm or less.

In the case of using the film as a retardation film, the ranges of Re and Rth vary depending on the kind of the retardation film and there are diversified needs, but at the measurement wavelength of 590 nm, the ranges are preferably $0 \text{ nm} \leq \text{Re} \leq 100 \text{ nm}$ and $40 \text{ nm} \leq \text{Rth} \leq 400 \text{ nm}$. At the measurement wavelength of 590 nm, the ranges are more preferably $0 \text{ nm} \leq \text{Re} \leq 20 \text{ nm}$ and $40 \text{ nm} \leq \text{Rth} \leq 80 \text{ nm}$ for TN mode, and $20 \text{ nm} \leq \text{Re} \leq 80 \text{ nm}$ and $80 \text{ nm} \leq \text{Rth} \leq 400 \text{ nm}$ for VA mode. For VA mode, the ranges are still more preferably $30 \text{ nm} \leq \text{Re} \leq 75 \text{ nm}$ and $120 \text{ nm} \leq \text{Rth} \leq 250 \text{ nm}$. In the case of a VA-mode optically compensatory film, from the standpoint of color shift at the black display time and viewing angle dependency of the contrast, $50 \text{ nm} \leq \text{Re} \leq 75 \text{ nm}$ and $180 \text{ nm} \leq \text{Rth} \leq 250 \text{ nm}$ are preferred when compensation is effected by one sheet of the retardation film, and $30 \text{ nm} \leq \text{Re} \leq 50 \text{ nm}$ and $80 \text{ nm} \leq \text{Rth} \leq 140 \text{ nm}$ are preferred when compensation is effected by two sheets of the retardation film. For OCB mode, at the measurement wavelength of 590 nm, $30 \text{ nm} \leq \text{Re} \leq 70 \text{ nm}$ and $120 \text{ nm} \leq \text{Rth} \leq 300 \text{ nm}$ are preferred. Desired optical properties can be realized by appropriately controlling the structure of polymer used in the film of the present invention, the kind and added amount of additive, and the process conditions such as stretch ratio and residual volatile content at the separation.

In the context of the present invention, $Re(\lambda)$ and $Rth(\lambda)$ indicate the in-plane retardation and the retardation in a thickness direction, respectively, at a wavelength of λ. Re(λ) is measured by making light at a wavelength of λ nm to be incident in the film normal direction in KOBRA 21ADH or WR (manufactured by Oji Scientific Instruments). As for the selection of the measurement wavelength λ nm, the measurement can be performed by manually exchanging the wavelength selection filter or converting the measured value by a program or the like.

In the case where the film measured is a film expressed by a uniaxial or biaxial refractive index ellipsoid, Rth(λ) is calculated by the following method.

The above-described Re(λ) is measured at 6 points in total by making light at a wavelength of λ nm to be incident from directions tilted with respect to the film normal direction in 10° steps up to 50° on one side from the normal direction with the in-plane slow axis (judged by KOBRA 21ADH or WR) being used as the inclination axis (rotation axis) (when the slow axis is not present, an arbitrary direction in the film plane is used as the rotation axis) and based on the retardation values measured, hypothetical values of average refractive index and film thickness value input, Rth(λ) is calculated by KOBRA 21ADH or WR.

In the above, when the film has a direction where the retardation value becomes zero at a certain inclination angle from the normal direction with the rotation axis being the in-plane slow axis, the retardation value at an inclination angle larger than that inclination angle is calculated by KOBRA 21ADH or WR after converting its sign into a negative sign.

Incidentally, after measuring the retardation value from two arbitrary tilted directions by using the slow axis as the inclination axis (rotation axis) (when the slow axis is not present, an arbitrary direction in the film plane is used as the rotation axis), based on the values obtained, hypothetical values of average refractive index and film thickness value input, Rth can also be calculated according to the following formulae (1) and (2):

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Formula (1)

Note: Re(θ) above represents the retardation value in the direction tilted at an angle of θ from the normal direction. In formula (1), nx represents the refractive index in the in-plane slow axis direction, ny represents the refractive index in the direction crossing with nx at right angles in the plane, nz represents the refractive index in the direction crossing with nx and ny at right angles, and d represents the thickness of the film.

$$Rth = \left[\frac{nx + ny}{2} - nz\right] \times d$$

Formula (2)

In the case where the film measured is a film incapable of being expressed by a uniaxial or biaxial refractive index ellipsoid, that is, a so-called film having no optic axis, Rth(λ) is calculated by the following method.

The above-described Re(λ) is measured at 11 points by making light at a wavelength of λ nm to be incident from directions tilted with respect the film normal direction in 10° steps from −50° to +50° with the inclination axis (rotation axis) being the in-plane slow axis (judged by KOBRA 21ADH or WR) and based on the retardation values measured, hypothetical values of average refractive index and film thickness value input, Rth(λ) is calculated by KOBRA 21ADH or WR.

In the measurement above, as for the hypothetical value of average refractive index, the values described in *Polymer Handbook* (John Wiley & Sons, Inc.) and catalogues of various optical films can be used. The average refractive index of which value is unknown can be measured by an Abbe refractometer. The values of average refractive index of main optical films are, for example, as follows: cellulose acylate (1.48), cycloolefin polymer (1.52), polycarbonate (1.59), polymethyl methacrylate (1.49) and polystyrene (1.59). When these hypothetical values of average refractive index and the film thickness are input, KOBRA 21ADH or WR calculates nx, ny and nz and from these calculated nx, ny and nz, Nz=(nx−nz)/(nx−ny) is further calculated.

(Polarizing Plate)

A polarizing plate usually has a polarizer and two sheets of transparent protective film disposed on both sides thereof. The film containing the copolymer of the present invention can be used as the protective film on one side or both sides. As for the protective film on the other side, a normal cellulose acylate film or the like may be used. The polarizer includes an iodine-based polarizer, a dye-based polarizer using a dichroic dye, and a polyene-based polarizer. The iodine-based polarizer and the dye-based polarizer are generally produced using a polyvinyl alcohol-based film. In the case of using the cyclic polyolefin-based film of the present invention as a polarizing plate protective film, the film is subjected to a surface treatment as described later, and the treated surface of the film is then laminated to the polarizer by using an adhesive. Examples of the adhesive which is used include a polyvinyl alcohol-based adhesive such as polyvinyl alcohol and polyvinyl butyral, a vinyl-based latex such as butyl acrylate, and gelatin. The polarizing plate is composed of a polarizer and protective films protecting both surfaces thereof. Furthermore, a protective film is laminated to one surface of the polarizing plate, and a separate film is laminated to the opposite surface, whereby the polarizing plate is fabricated. The protective film and separate film are used for the purpose of protecting the polarizing plate at the shipment of the polarizing plate, at the product inspection, or the like. In this case, the protective film is laminated for the purpose of protecting the surface of the polarizing plate and is used on the side opposite the surface through which the polarizing plate is laminated to a liquid crystal plate. The separate film is used for the purpose of covering the adhesive layer adhered to a liquid crystal plate and is used on the side through which the polarizing plate is laminated to a liquid crystal plate.

The film of the present invention is preferably laminated to the polarizer so that the transmission axis of the polarizer can agree with the slow axis of the film of the present invention.

(Surface Treatment of Film)

In the present invention, the film is preferably subjected to a surface treatment so as to improve the adhesion between the polarizer and the protective film. As for the surface treatment, any method may be utilized as long as the adhesion can be improved, but preferred examples of the surface treatment include a glow discharge treatment, an ultraviolet irradiation treatment, a corona treatment, and a flame treatment. The glow discharge treatment as used herein indicates a treatment with so-called low temperature plasma generated in a low-pressure gas. In the present invention, a plasma treatment under an atmospheric pressure is also preferred. Other details of the glow discharge treatment are described in U.S. Pat. Nos. 3,462,335, 3,761,299 and 4,072,769, and British Patent 891469. The method described in JP-A-59-556430 is also used, where the discharge atmospheric gas composition is designed to consist of only the gas species generated in the vessel when a polyester support itself is subjected to the discharge treatment after the start of discharge. In addition, the method described in JP-B-60-16614 (the term "JP-B" as used herein means an "examined Japanese patent publication") is also applicable, where the discharge treatment is performed by setting the film at a surface temperature of 80 to 180° C. during vacuum glow discharge treatment.

As regards the degree of surface treatment, the preferred range varies depending on the kind of surface treatment and the kind of copolymer, but it is preferred that as a result of the surface treatment, the contact angle on the surface of the surface-treated protective film for pure water becomes less than 50°. The contact angle is more preferably from 25° to less than 45°. When the contact angle of the protective film surface for pure water is in the above-describe range, a good adhesive strength between the protective film and the polarizing film is achieved.

(Adhesive)

At the time of laminating a protective film composed of the surface-treated film to the polarizer composed of polyvinyl alcohol, an adhesive containing a water-soluble polymer is preferably used.

Examples of the water-soluble polymer preferably used for the adhesive include a homopolymer or copolymer having an ethylenically unsaturated monomer as a constituent element, such as N-vinylpyrrolidone, acrylic acid, methacrylic acid, maleic acid, β-hydroxyethyl acrylate, β-hydroxyethyl methacrylate, vinyl alcohol, methyl vinyl ether, vinyl acetate, acrylamide, methacrylamide, diacetone acrylamide, and vinylimidazole, and also include polyoxyethylene, polyoxypropylene, poly-2-methyloxazoline, methyl cellulose, hydroxyethyl cellulose, and hydroxypropyl cellulose gelatin. In the present invention, among these, PVA and gelatin are preferred. The thickness of the adhesive layer is, after drying, preferably from 0.01 to 5 μm, more preferably from 0.05 to 3 μm.

(Antireflection Layer)

The transparent protective film of the polarizing plate, which is disposed on the side opposite the liquid crystal cell, is preferably provided with a functional film such as antireflection layer. Particularly, in the present invention, an antireflection layer configured by stacking at least a light scattering layer and a low refractive index layer in this order on the protective film, or an antireflection layer configured by stacking a medium refractive index layer, a high refractive index layer and a low refractive index layer in this order on the protective film, is suitably used.

(Light Scattering Layer)

The light scattering layer is formed for the purpose of providing the film with light diffusibility by surface scattering and/or internal scattering and hardcoat property for enhancing the scratch resistance of the film. Accordingly, the layer is formed to contain a binder for imparting hardcoat property, a matting particle for imparting light diffusibility, and if desired, an inorganic filler for highering the refractive index, preventing the crosslinking shrinkage and increasing the strength.

The film thickness of the light scattering layer is preferably from 1 to 10 μm, more preferably from 1.2 to 6 μm, from the standpoint of imparting hardcoat property and suppressing generation of curling and worsening of brittleness.

(Other Layers of Antireflection Layer)

Furthermore, a hardcoat layer, a front scattering layer, a primer layer, an antistatic layer, an undercoat layer, a protective layer, and the like may be provided.

(Hardcoat Layer)

The hardcoat layer is provided on the surface of the transparent support for imparting physical strength to the transparent protective film provided with the anti-reflection layer. In particular, the hardcoat layer is preferably provided between the transparent support and the high refractive index layer. The hardcoat layer is preferably formed by a crosslinking or polymerization reaction of a photo- and/or heat-curable compound. The curable functional group is preferably a photopolymerizable functional group, and the hydrolyzable functional group-containing organometallic compound is preferably an organic alkoxysilyl compound.

(Antistatic Layer)

In the case of providing an antistatic layer, an electric conductivity giving a volume resistivity of $10^{-8}$ ($\Omega cm^{-3}$) or less is preferably imparted. The volume resistivity of $10^{-8}$ ($\Omega cm^{-3}$) can be imparted by using a hygroscopic substance, a water-soluble inorganic salt, a certain kind of surfactant, a cation polymer, an anion polymer, colloidal silica or the like, but this has a problem that the temperature and humidity dependency is large and a sufficient electric conductivity cannot be ensured at low humidity. Accordingly, a metal oxide is preferred as the electrically conductive layer material.

(Liquid Crystal Display Device)

The cyclic polyolefin-based film of the present invention, the retardation film comprising the film, and the polarizing plate using the film can be employed for liquid crystal cells and liquid crystal display devices of various display modes. There have been proposed various display modes such as TN (Twisted Nematic), IPS (In-Plane Switching), FLC (Ferroelectric Liquid Crystal), AFLC (Anti-ferroelectric Liquid Crystal), OCB (Optically Compensatory Bend), STN (Super Twisted Nematic), VA (Vertically Aligned), and HAN (Hybrid Aligned Nematic). Of these, use for OCB mode or VA mode is preferred.

EXAMPLES

The present invention is described in greater detail below by referring to Examples. As regards the materials, amounts used, ratios, contents of treatment, procedures of treatment, and the like set forth in the following Examples, appropriate changes can be made without departing from the scope of the present invention. Accordingly, the present invention should not be construed as being limited to these Examples.

Raw materials used in Examples and Comparative Examples are as follows. Toluene (solvent), norbornene, 1-hexane, 1-octene, 1-decene and 1-dodecene all were used after purification by distillation and well drying. The polymerization catalyst used was [(tert-BuNSiMe$_2$Flu)TiMe$_2$] which was synthesized based on the description in *Macromolecules*, Vol. 31, page 3184 (1998). As for the promoter, a modified methylaminohexane (MMAO-3A) toluene solution (produced by Tosoh Finechem Corp.) was purchased and directly used.

A 200 ml-volume flask equipped with a stirring blade and connected to a vacuum line, an ethylene line, a propylene line and an argon line was used as the polymerization apparatus, and a copolymerization reaction was performed as follows.

Synthesis Example 1: Synthesis of Copolymer P1

After the inside of a flask was displaced with an argon gas, 45.1 mL of toluene, 2.9 g of norbornene, 0.6 g of 1-hexene, and 3.9 mL of MMAO-3A were added to the vessel and freeze-deaerated. Subsequently, the temperature was raised to 30° C. and the contents were stirred at 30° C. for 10 minutes while flowing propylene into the flask at 1 atm. Separately, in a Schlenk, 14.9 mg of (tert-BuNSiMe$_2$Flu)TiMe$_2$ was dissolved in 2 mL of toluene in an argon atmosphere. This catalyst solution (1 mL) was added to the flask and polymerization was initiated. After the polymerization was performed at 30° C. for 10 minutes while continuing flowing propylene at 1 atm, a small amount of methanol was added and the reaction was completed. Thereafter, the reaction mixture was poured in a large amount of methanol that was made acidic with hydrochloric acid, and a precipitate was deposited, separated by filtration, washed and dried to obtain 1.9 g of Copolymer P1.

Synthesis Example 2: Synthesis of Copolymer P2

A copolymer was synthesized in the same manner as in Synthesis Example 1 except for changing the charge amount of 1-hexene to 1.3 g, whereby 2.0 g of Copolymer P2 was obtained.

Synthesis Example 3: Synthesis of Copolymer P3

A copolymer was synthesized in the same manner as in Synthesis Example 1 except for performing the polymerization by using 0.8 g of 1-octene in place of 1-hexene, whereby 3.0 g of Copolymer P3 was obtained.

Synthesis Example 4: Synthesis of Copolymer P4

A copolymer was synthesized in the same manner as in Synthesis Example 1 except for performing the polymerization by using 1.6 g of 1-octene in place of 1-hexene, whereby 2.8 g of Copolymer P4 was obtained.

Synthesis Example 5: Synthesis of Copolymer P5

A copolymer was synthesized in the same manner as in Synthesis Example 1 except for using 1.7 g of 1-octene in place of 1-hexene and changing the polymerization time to 13 minutes, whereby 3.2 g of Copolymer P5 was obtained.

Synthesis Example 6: Synthesis of Copolymer P6

A copolymer was synthesized in the same manner as in Synthesis Example 1 except for performing the polymerization by using 2.1 g of 1-decene in place of 1-hexene, whereby 2.8 g of Copolymer P6 was obtained.

Synthesis Example 7: Synthesis of Copolymer P7

A copolymer was synthesized in the same manner as in Synthesis Example 1 except for performing the polymerization by using 4.3 g of 1-decene in place of 1-hexene, whereby 3.0 g of Copolymer P7 was obtained.

Synthesis Example 8: Synthesis of Copolymer P8

A copolymer was synthesized in the same manner as in Synthesis Example 1 except for performing the polymerization by using 6.4 g of 1-decene in place of 1-hexene, whereby 4.2 g of Copolymer P8 was obtained.

Synthesis Example 9: Synthesis of Comparative Copolymer P9

A copolymer was synthesized in the same manner as in Synthesis Example 1 except for performing the polymerization by using 1.3 g of 1-dodecene in place of 1-hexene, whereby 2.6 g of Copolymer P9 was obtained.

Synthesis Example 10: Synthesis of Copolymer PP1

A copolymer was synthesized in the same manner as in Synthesis Example 1 except for performing the polymerization without using 1-hexene, whereby 3.3 g of Comparative Copolymer PP1 was obtained.

Synthesis Example 11: Synthesis of Comparative Copolymer PP2

A copolymer was synthesized in the same manner as in Synthesis Example 1 except for performing the polymerization by using no 1-hexene and using ethylene in place of propylene, whereby 3.7 g of Comparative Copolymer PP2 was obtained.

Synthesis Example 12: Synthesis of Comparative Copolymer PP3

After the inside of a flask was displaced with an argon gas, 45.1 mL of toluene, 2.9 g of norbornene and 7.7 g of 1-hexene were charged to the vessel, 3.9 mL of MMAO-3A was then added, and the system was freeze-deaerated. Subsequently, the temperature was raised to 30° C., and the inside of the flask was again displaced with an argon gas. Separately, in a Schlenk, 14.9 mg of (tert-BuNSiMe$_2$Flu)TiMe$_2$ was dissolved in 2 mL of toluene in an argon atmosphere. This catalyst solution (1 mL) was added to the flask and polymerization was initiated. After the reaction was performed at 30° C. for 15 minutes, a small amount of methanol was added and the reaction was completed. The obtained reaction mixture was charged in a large amount of methanol that was made acidic with hydrochloric acid, and a precipitate was deposited, separated by filtration, washed and dried to obtain 4.0 g of Comparative Copolymer PP3.

Synthesis Example 13: Synthesis of Comparative Copolymer PP4

A copolymer was synthesized in the same manner as in Synthesis Example 12 except for performing the polymerization by using 8.7 g of 1-decene in place of 1-hexene, whereby 3.3 g of Comparative Copolymer PP4 was obtained.

Synthesis Example 14: Synthesis of Copolymer P10

A copolymer was synthesized in the same manner as in Synthesis Example 1 except for performing the polymerization by using 0.4 g of 1-octene in place of 1-hexene, whereby 3.1 g of Copolymer P10 was obtained.

Synthesis Example 15: Synthesis of Copolymer P11

A copolymer was synthesized in the same manner as in Synthesis Example 1 except for performing the polymerization by using 0.8 g of 1-decene in place of 1-hexene, whereby 2.4 g of Copolymer P11 was obtained.

Synthesis Example 16: Synthesis of Copolymer P12

A copolymer was synthesized in the same manner as in Synthesis Example 1 except for performing the polymerization by using 1.1 g of 1-decene in place of 1-hexene, whereby 2.6 g of Copolymer P12 was obtained.

The composition (the ratio of constituents units derived from respective monomers in the copolymer), weight average molecular weight and glass transition temperature of each of Copolymers P1 to P12 and PP1 to PP4 obtained in Synthesis Examples 1 to 16 are shown in Table 1. The glass transition temperature was determined by DSC measurement. In the case where distinct Tg was not observed by DSC measurement, a film sample (strip of 0.5 cm×2.0 cm) was prepared and the thermal deformation initiating temperature obtained by the TMA tensile loading method under the condition of a tensile load of 100 mN was taken as the glass transition temperature of the film.

used was changed to P2 to P12 and PP1 to PP4 and the melting temperature and casting roll temperature were appropriately adjusted to give a film thickness of 100 μm. The films obtained all were excellent in the transparency and homogeneity, assured of good surface property and almost free of die streaks or foreign matters. Also, these films were sufficiently tough to cause no problem during winding around a roll and subsequent handling.

<Evaluation of Film Brittleness>

Using the unstretched films obtained, the film brittleness was evaluated. The evaluation of brittleness was performed by a method where the obtained film was humidity-conditioned at 25° C.-60% RH for 2 hours or more, three sheets of 20 mm×20 mm square film were punched out using HANDY THOMSON Model M (manufactured by OPEX Japan Inc.), and four corners of each film strip (three sheets×4 corners=12 portions) were observed by an optical microscope to confirm the presence or absence of crazes or cracks.

TABLE 1

| Copolymer | Compositional Ratio (mol %) of Structural Units Derived From Respective Monomers in Copolymer | | | | | | | Mw | Glass Transition Temperature (° C.) |
|---|---|---|---|---|---|---|---|---|---|
| | Norbornene | Ethylene | Propylene | 1-Hexene | 1-Octene | 1-Decene | 1-Dodecene | | |
| P1 | 42 | — | 37 | 21 | — | — | — | 138,000 | 124 |
| P2 | 36 | — | 31 | 33 | — | — | — | 144,000 | 105 |
| P3 | 65 | — | 26 | — | 9 | — | — | 173,000 | 160 |
| P4 | 63 | — | 22 | — | 15 | — | — | 163,000 | 157 |
| P5 | 52 | — | 31 | — | 17 | — | — | 176,000 | 165 |
| P6 | 63 | — | 25 | — | — | 12 | — | 161,000 | 155 |
| P7 | 56 | — | 20 | — | — | 24 | — | 170,000 | 106 |
| P8 | 41 | — | 28 | — | — | 31 | — | 158,000 | 92 |
| P9 | 69 | — | 24 | — | — | — | 7 | 129,000 | 159 |
| P10 | 64 | — | 32 | — | 4 | — | — | 180,000 | 168 |
| P11 | 59 | — | 39 | — | — | 2 | — | 178,000 | 166 |
| P12 | 68 | — | 24 | — | — | 8 | — | 145,000 | 166 |
| PP1 | 51 | — | 49 | — | — | — | — | 166,000 | 150 |
| PP2 | 45 | 55 | — | — | — | — | — | 115,000 | 159 |
| PP3 | 48 | — | — | 52 | — | — | — | 163,000 | 128 |
| PP4 | 49 | — | — | — | 51 | — | — | 164,000 | 108 |

Example 1: Melt Film Formation of Film F1

Copolymer P1 was melt-extruded from a coat-hanger die by using a twin-screw melt extruder adjusted to from 180° C. (inlet temperature) to 230° C. (outlet temperature), and the molten extrudate was extruded onto a series of three casting rolls set to glass transition temperature Tg−5° C., Tg, and Tg−10° C. to form Unstretched Film F1. The film thickness was 100 μm. The film was excellent in the transparency and homogeneity, assured of good surface property, and almost free of die streaks or foreign matters. Also, this film was sufficiently tough to cause no problem during winding around a roll and subsequent handling.

Examples 2 to 12 and Comparative Examples 1 to 4: Melt Film Formation of Films F2 to F12 and FP1 to FP4

Unstretched Films F2 to F12 and FP1 to FP4 were prepared in the same manner as in Example 1 except that the copolymer The criteria for evaluation are as follows.
A: Generation of cracks or crazes was not observed at all corners of 12 portions.
B: Generation of cracks or crazes was observed at 1 or 2 corners out of 12 portions.
C: Generation of cracks or crazes was observed at 3 to 6 corners out of 12 portions.
D: Generation of cracks or crazes was observed at 7 or more corners out of 12 portions.

<Measurement of Film Modulus>

Test specimens of 10 mm×50 mm from Unstretched Films F1 to F12 and FP1 to FP4 were humidity-conditioned at 25° C.-60% RH for 2 hours or more and then subjected to a tensile test using a Tensilon universal tester (manufactured by ORIENTEC Co., Ltd.) under the conditions of a chuck-to-chuck distance of 30 mm, a temperature of 25° C. and a stretching rate of 3 mm/min, and the modulus of elasticity was measured. The measurement was performed on three samples, and an average thereof was determined.

The results of brittleness evaluation and modulus measurement are shown in Table 2 below.

TABLE 2

| | Film | Copolymer | Punching Test | Modulus of Elasticity (GPa) |
|---|---|---|---|---|
| Example 1 | F1 | P1 | A | 1.7 |
| Example 2 | F2 | P2 | A | 1.7 |
| Example 3 | F3 | P3 | A | 1.8 |
| Example 4 | F4 | P4 | B | 1.8 |
| Example 5 | F5 | P5 | A | 1.7 |
| Example 6 | F6 | P6 | B | 1.8 |
| Example 7 | F7 | P7 | A | 1.8 |
| Example 8 | F8 | P8 | A | 1.6 |
| Example 9 | F9 | P9 | A | 1.7 |
| Example 10 | F10 | P10 | A | 1.9 |
| Example 11 | F11 | P11 | A | 1.9 |
| Example 12 | F12 | P12 | A | 1.8 |
| Comparative Example 1 | FP1 | PP1 | D | 1.9 |
| Comparative Example 2 | FP2 | PP2 | D | 1.8 |
| Comparative Example 3 | FP3 | PP3 | A | 1.3 |
| Comparative Example 4 | FP4 | PP4 | A | 1.2 |

As seen from Table 2, Films F1 to F12 formed from Copolymers P1 to P12 of the present invention had high modulus of elasticity and in all films, generation of cracks or crazes was not observed or if any, very slight. That is, it is understood that these films are improved in the brittleness and also have suitable strength as a film. On the other hand, Films FP1 and FP2 formed from Comparative Copolymers PP1 and PP2 had high modulus of elasticity, but generation of cracks or crazes at the punching was observed at 7 or more portions and these films were brittle. Furthermore, Films FP3 and FP4 formed from Comparative Copolymers PP3 and PP4 were found to have low modulus of elasticity and fail in having suitable strength as a film, though generation of cracks or crazes was not observed and the brittleness was improved.

What is claimed is:

1. A copolymer comprising:
   10 to 69 mol % of a structural unit derived from propylene;
   1 to 50 mol % of a structural unit derived from at least one α-olefin having a carbon number of from 4 to 20; and
   30 to 89 mol % of a structural unit derived from at least one cyclic olefin represented by the following formula (1),
   wherein the copolymer has a weight average molecular weight of from 50,000 to 1,000,000:

Formula (1):

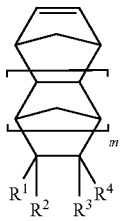

wherein $R^1$ to $R^4$ each independently represent a hydrogen atom or an alkyl group, at least two of $R^1$ to $R^4$ may be combined with each other to form a monocyclic or polycyclic ring, and the monocyclic or polycyclic ring may have a double bond; m represents 0 or 1; and a pair of $R^1$ and $R^2$ or of $R^3$ and $R^4$ may form an alkylidene group.

2. The copolymer as claimed in claim 1, wherein, in the formula (1), m is 0.

3. The copolymer as claimed in claim 1, wherein the structural unit derived from at least one α-olefin having a carbon number of from 4 to 20 is a structural unit derived from at least one α-olefin having a carbon number of from 4 to 15.

4. The copolymer as claimed in claim 2, wherein the structural unit derived from at least one α-olefin having a carbon number of from 4 to 20 is a structural unit derived from at least one α-olefin having a carbon number of from 4 to 15.

5. The copolymer as claimed in claim 1, wherein the structural unit derived from at least one α-olefin having a carbon number of from 4 to 20 is a structural unit derived from at least one α-olefin having a carbon number of from 6 to 12, and the structural unit derived from at least one cyclic olefin represented by the following formula (1) is a structural unit derived from norbornene.

6. The copolymer as claimed in claim 1, wherein the copolymer comprises:
   15 to 55 mol % of the structural unit derived from propylene;
   1 to 40 mol % of the structural unit derived from at least one α-olefin having a carbon number of from 4 to 20; and
   35 to 80 mol % of the structural unit derived from at least one cyclic olefin represented by the following formula (1).

7. The copolymer as claimed in claim 1, wherein the copolymer comprises:
   20 to 40 mol % of the structural unit derived from propylene;
   1 to 35 mol % of the structural unit derived from at least one α-olefin having a carbon number of from 4 to 20; and
   35 to 70 mol % of the structural unit derived from at least one cyclic olefin represented by the following formula (1).

8. A film comprising the copolymer claimed in claim 1.

9. A polarizing plate comprising the film claimed in claim 8.

10. A liquid crystal display device comprising the polarizing plate claimed in claim 9.

* * * * *